March 17, 1931. H. A. BUCKERT 1,796,826
AUDIBLE SIGNAL FOR MOTOR VEHICLES
Filed Dec. 23, 1929

INVENTOR
H. A. BUCKERT
BY
ATTORNEY

Patented Mar. 17, 1931

1,796,826

UNITED STATES PATENT OFFICE

HOMER A. BUCKERT, OF ST. LOUIS, MISSOURI

AUDIBLE SIGNAL FOR MOTOR VEHICLES

Application filed December 23, 1929. Serial No. 415,975.

This invention relates generally to warning signal devices for motor vehicles and the like, and more specifically to an improved air-operated warning signal device, the predominant object of the invention being to provide an improved warning signal device which is associated preferably with the intake manifold of the internal combustion engine of a motor vehicle in a manner to cause the signal to be sounded as a result of the vacuum within said intake manifold.

It is quite generally understood that the reciprocating pistons of an internal combustion engine create a partial vacuum within the intake manifold of the engine, and it is obvious that if a passageway leading from the outer atmosphere to the interior of an intake manifold were arranged in an open condition, air from the outer atmosphere would rush through said passageway into the intake manifold.

In accordance with the present invention, I take advantage of these conditions to provide an improved and simple warning signal device. Briefly stated, the housing of the signal device provides a passageway which leads from the outer atmosphere to the interior of the intake manifold of an internal combustion engine with which the improved warning signal is associated, and I arrange within said housing a reed, or other suitable sound-producing means. I likewise provide the improved signal device with suitable valve means for controlling the passage of air through the housing of the signal device, which valve means is connected by a connector to valve-operating elements arranged convenient to the position of the operator of the motor vehicle. The signal device is sounded by unseating the valve to permit air to rush through the valve housing to fill the void within the intake manifold of the engine, and this rush of air sounds the sound-producing means located within said housing of the signal device.

Figure 1:
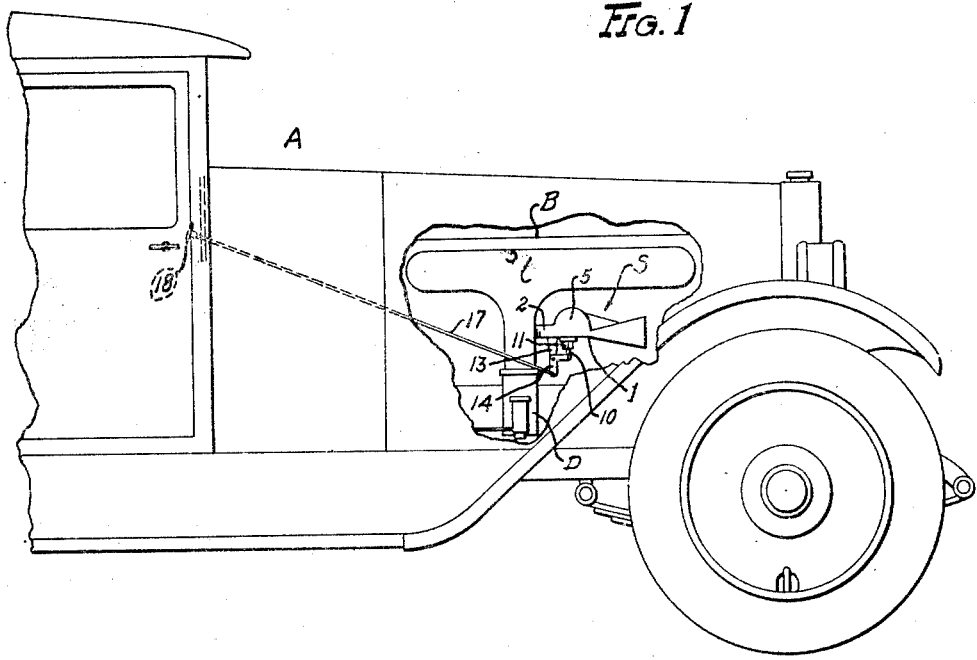
Fig. 1 is a side elevation of the forward portion of a motor vehicle, a portion of the hood of said motor vehicle being broken away to show my improved warning signal device in association with the intake manifold of the internal combustion engine of the motor vehicle.

In the drawing, wherein is shown for the purpose of illustration, merely, one embodiment of the invention, A designates a motor vehicle of well known construction, said motor vehicle being provided with a power plant comprising an internal combustion engine B having an intake manifold C associated therewith, which leads from the carbureter D to the top portion of the cylinder of the internal combustion engine. As already stated and as is very well known, the reciprocating pistons within the cylinders of the internal combustion engine create a vacuum within the intake manifold c.

S designates my improved warning signal device, which comprises a housing 1 having a screw-threaded portion 2 at its inner end which is screwed into a screw-threaded opening 3 formed in the wall of the intake manifold C. 4 designates a passsageway which is formed in the portion 2 of the housing and extends into the intermediate portion 5 thereof, said passageway being open at the rear end of said portion 2 and being closed at its forward end by a wall 6.

Formed in the wall of the passageway 4 at the top and adjacent to the forward end thereof is an aperture 7 provided with a valve seat 8, and 9 designates a valve which is arranged to seat against said valve seat 8 and thus control passage of air through the aperture 7. The valve 9 is associated with a stem 10 which passes through a plug 11 secrewed into a screw-threaded opening formed in the wall of the passageway 4 at a point beneath and in vertical alinement with the aperture 7 already referred to, and 12 designates a coil spring which tends to force the valve 9 upwardly against the valve seat 8, said coil spring being interposed between the top face of the plug 11 and the bottom face of said valve. Extended downwardly from the portion 2 of the housing 1 is a supporting element 13 to which a bell crank lever 14 is pivoted at 15, one leg of said bell crank lever being attached by a slot and pin connection 16 to the lower end of the stem 10, and the other leg of said bell crank level having a connector 17 attached thereto. The connector 17 at the end thereof opposite to the end which is attached to the bell crank lever is provided with an operating element 18, said operating element being arranged convenient to the position of the operator of the motor vehicle. The operating element illustrated is adapted for hand operation, but if desired this operating element may take the form of a pedal or any other suitable arrangement for moving the connector 17 longitudinally.

Figure 2:
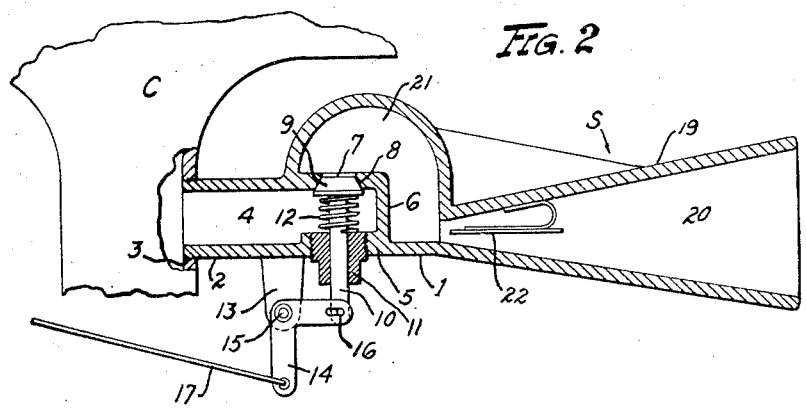
Fig. 2 is a view partially inside elevation and partially in section showing my improved signal device associated with a fragment of an intake manifold.

The forward portion 19 of the housing 1 is flared to provide a passageway 20 of gradually increasing dimensions, as shown in Fig. 2, and the rear end of this passageway 20 is arranged in communication with the aperture 7 through the medium of a curved passageway 21. Located within the passageway 20 is a suitable reed 22, or other sound-producing element of suitable construction.

When the operator of a motor vehicle equipped with my improved signal device desires to sound a warning, he merely moves the connector 17 rearwardly by pulling the operating element. This has the effect of unseating the valve 9, whereupon air from the outer atmosphere will rush through the housing 1 and enter the intake manifold, and during such rush of air the sound-producing device 22 will be operated. The sounding of the device will continue until the operating element 18 is released, when the coil spring 12 will reseat the valve 9 and interrupt passage of air through the housing of the device.

I claim:

1. In combination with a portion of an internal combustion engine wherein a partial vacuum is present, a signal device including a housing provided with a passageway formed therethrough, through which air may pass, the outer end of the passageway formed through said housing being open to atmosphere and the inner end thereof being in direct communication with the interior of said portion of the internal combustion engine, sound-producing means within said passageway arranged for operation by air passing therethrough, and means including a valve located within said housing for controlling passage of air through said passageway.

2. In combination with a portion of an internal combustion engine wherein a partial vacuum is present, a signal device including a housing provided with a passageway formed therethrough, through which air may pass, the outer end of the passageway formed through said housing being open to atmosphere and the inner end thereof being in direct communication with the interior of said portion of the internal combustion engine, sound-producing means within said passageway arranged for operation by air passing therethrough, and means including a valve located within said housing for controlling passage of air through said passageway, said means including means for operating said valve from a point remote from said internal combustion engine.

3. In combination with a motor vehicle provided with an internal combustion engine having a portion wherein a partial vacuum is present, a signal device including a housing provided with a passageway formed therethrough, through which air may pass, the outer end of the passageway formed through said housing being open to atmosphere and the inner end thereof being in direct communication with the interior of said portion of the internal combustion engine, sound-producing means within said passageway arranged for operation by air passing therethrough, and means including a valve located within said housing for controlling passageway of air through said passageway, said means including a bell crank lever for operating said valve from the position of the operator of the motor vehicle.

In testimony that I claim the foregoing, I hereunto affix my signature.

HOMER A. BUCKERT.